United States Patent [19]

Wolff

[11] Patent Number: 4,733,704
[45] Date of Patent: Mar. 29, 1988

[54] WORKBENCH

[76] Inventor: Robert Wolff, Im Kiesacker 12, 5446 Engeln, Fed. Rep. of Germany

[21] Appl. No.: 901,798

[22] Filed: Aug. 29, 1986

Related U.S. Application Data

[63] Continuation-in-part of Ser. No. 855,460, Apr. 24, 1986, abandoned.

[30] Foreign Application Priority Data

Oct. 30, 1985 [DE] Fed. Rep. of Germany ....... 3538529
Apr. 29, 1986 [DE] Fed. Rep. of Germany . 8611721[U]

[51] Int. Cl.⁴ ............................................. B27C 9/02
[52] U.S. Cl. .................................. 144/286 R; 83/574; 108/62; 108/159; 144/1 R
[58] Field of Search .................. 144/1 R, 286 R, 287; 83/574, 477.2, 473; 108/62, 159, 8, 113

[56] References Cited

U.S. PATENT DOCUMENTS 1,973,179 9/1934 Schwerin et al. ..................... 108/62
2,903,312 9/1959 Lawless .................................. 108/62
3,734,151 5/1973 Skripsky ............................... 144/1 R
4,265,283 5/1981 Nash et al. ....................... 144/286 R
4,350,193 9/1982 McCambridge et al. ...... 144/286 R
4,635,692 1/1987 Hulse et al. ..................... 144/286 R

FOREIGN PATENT DOCUMENTS 0148617 7/1985 European Pat. Off. .
2931559 2/1981 Fed. Rep. of Germany .
3347662 7/1984 Fed. Rep. of Germany .
02102 6/1984 PCT Int'l Appl. .

OTHER PUBLICATIONS

Tisch-und Gehrungssäge TGS 71 NEU

Primary Examiner—W. Donald Bray
Attorney, Agent, or Firm—Antonelli, Terry & Wands

[57] ABSTRACT

A workbench which includes a workpiece supporting panel carried by a trestle. A clamping device rigidly attaches a manually operated machine tool to an underside of the supporting panel. The machine tool may, for example, be a circular saw, a compass saw, or a router. The supporting panel is provided with at least one cutout for accommodating a portion of the tool of the machine tool such as, for example, a saw blade or a cutter. To simplify the mounting of the manually operated machine tool on the underside of the supporting panel, the supporting panel is adapted to be pivoted from an operative position into a mounting position through an angle of 180° with a locking device being provided for both rotational positions. A slot insert of a chippable material can be provided in the cutout to avoid the danger that pieces of hard metal will fly off the blade if the blade shifts sideways while sawing.

34 Claims, 14 Drawing Figures

WORKBENCH

This application is a continuation-in-part of Ser. No. 855,460, filed Apr. 24, 1986, abandoned.

BACKGROUND OF THE INVENTION

The present invention relates to a workbench and, more particularly, to a workbench which includes a workpiece supporting panel carried by a trestle, with a clamping means for enabling a rigid attachment of a manually operated machine tool such as, for example, a circular saw, a compass saw, or a router, mounted on an underside of the supporting panel, and with the supporting panel including at least one cutout or opening for accommodating a portion of the machine tool such as, for example, a saw blade or cutter.

A variety of workbenches have been proposed wherein it is possible, for example, to convert a mobile or portable circular hand saw to a stationary circular table saw whereby the utility of the mobile or portable hand saw for persons working at home is considerably expanded since it is possible to convert the portable machine unit and associated power drive mechanisms with a static or stationary structure.

However, a disadvantage of conventional workbenches resides in the fact that the workbenches must be turned over to enable a mounting of a machine tool in order to provide access to an underside of a workpiece support panel of the workbench. During this mounting procedure, a topside of the supporting panel must be placed on separate supporting members so that an adequate free space remains for the tool projecting through the cutout or opening of the supporting panel; therefore, a retrofitting of conventional workbenches is always accompanied by considerable expenses. A more practical saw-workbench is shown in U.S. Pat. No. 4,465,114.

The aim underlying the present invention essentially resides in providing a workbench of the aforementioned type wherein the mounting of the manually operated mobile or portable machine tool to an underside of a supporting table of a workbench is substantially simplified.

In accordance with the present invention, the supporting panel of the workbench can be swung or pivoted from an operative position into a mounting position by rotating the supporting panel through an angle of 180° with a locking device for both turning positions, that is, the operative and mounting positions, being arranged at a trestle of the workbench. After a pivoting of the supporting panel into the mounting position, the underside of the supporting panel is freely accessible at a convenient mounting level and the machine tool can be placed on the supporting panel without any auxiliary means and fixed in place by way of a clamping device. Of course, between the floor and the supporting panel there is always an adequate free space for the tool of the machine tool and, due to the provision of the locking device for both turning positions, an inadvertent swinging or pivoting of the supporting panel, together with the not as yet fixed machine tool is prevented during the mounting process of the machine tool.

According to advantageous features of the present invention, the supporting panel may be arranged at the trestle in a manner of a double lever and may, in the operative position, rest on one end of the trestle, while the other end of the supporting panel may be elastically bent in an upward direction by the locking device. By virtue of this arrangement, the workbench may be set up in a very compact fashion since no additional space is required for the mounting position of the supporting panel. In the operative position, the supporting panel is supported at three points, namely, at the trestle supporting point, at the pivot axis, and at the locking device so that the supporting panel can withstand even relatively high stresses.

Since, in accordance with the present invention, the supporting panel can be elastically bent in an upward direction by the locking device, a fixing or securing with respect to the trestle is obtained which is completely without play and which is insensitive to vibrations. With a rigid cast supporting panel, the upward flexing is in the order of tenths of a millimeter, whereas, with a more lightweight sheet metal supporting panel, the upward flexing is in the order of halves of a millimeter, whereby a guidance of the workpiece is not adversely affected. By elastically bending the supporting panel, the fixing of all parts secured to said panel, e.g. the machine tool, becomes better.

In accordance with still further features of the present invention, the supporting panel may be of a rectangular or square configuration and pivotable about an axis lying on or near one of an axis of symmetry thereof. Moreover, according to the invention, the supporting panel rests, in the operative position, with one end rim or edge in parallel to the pivot axis, on a stop of the trestle, and the locking device is adapted to engage in a zone or area of the opposite end rim or edge of the supporting panel.

Advantageously, according to the present invention, the stop may be fashioned as an abutment strip affixed to the trestle and aligned in parallel to the end rim or edge on a side of the stop, and the pivot axis may lie on a side facing away from the abut strip, a certain distance removed beside the corresponding axis of symmetry of the supporting panel. The provision of the abutment strip ensures a very broad, stable resting position of the supporting panel. By virtue of an offset arrangement of the pivot axis, it is possible for the end rim or edge, lying originally on the side of the locking device, to swing or pivot freely, without removing a possibly present parallel stop, past the abutment strip during the turning or pivoting of the support panel.

According to the present invention, the supporting panel is capable of being urged against the stop by the locking device and, preferably, the locking device includes at least two eccentric levers located on both sides of the supporting panel, mounted to lateral frames of the trestle encompassing the supporting panel, with the levers causing the supporting panel to be pressed from a loose or free unrestrained resting position against the stop.

Advantageously, in accordance with the invention, the trestle includes four legs attached to ends of two lateral frames, with the four legs on the side of the stop being joined by the abutment strip, and the opposite legs being joined by a cross strut lying at a lower level. The two lateral frames, the abutment strip and the cross strut form an inherently closed frame, whereby the trestle, in spite of the pivotability of the supporting panel, has a greater inner rigidity. The lower-level arrangement of the cross strut makes it possible to effect the necessary free swinging or pivoting of the supporting panel.

It is also possible in accordance with the present invention for the supporting panel to include several cutouts or openings for accommodating tools of different machine units thereby further simplifying a retrofitting of a workbench since any desired machine unit can be placed and mounted directly at a predetermined location on the supporting panel without requiring any further adapter elements or similar means.

Moreover, according to the present invention, the cutouts or openings in the supporting panel may be respectively arranged approximately along the pivot axis and the axis of symmetry of the supporting panel disposed in parallel thereto, in a side-by-side relationship. In this manner, all cutouts or openings are located in a central region of the workbench so that there is always an adequate supporting surface for enabling a guidance of the workpieces. Since the cutouts or openings are arranged side-by-side along the pivot axis, the supporting panel, is merely weakened by a single cutout, as the conventional workbenches, in a bending zone under great stress, that is, a central zone between the two lateral frames, whereas, the cutouts or openings arranged beside the first-mentioned cutout exert practically no negative effects with regard to the rigidity of the panel.

In accordance with still further features of the present invention, each of the eccentric levers include a bearing pin unilaterally flattened along a portion of a longitudinal direction thereof, with the flattened pin zones being inserted as eccentrics in openings provided in downwardly extending side walls of the supporting panel. Advantageously, the side walls are provided at respective opposite longitudinal ends with a second opening for enabling a fixing of the supporting panel in the mounting position.

The eccentric levers may, in accordance with the present invention, be provided with one-armed operating levers that project at an inside approximately perpendicularly from the bearing pins, with the operating levers being oriented, in the clamping position, approximately in parallel to the supporting panel and, in the released position, projecting in an upward direction approximately perpendicularly to the supporting panel. In accordance with still further features of the present invention, it is possible to strut brace the respective legs of the trestle together by an appropriate base frame to reinforce or rigidify the trestle construction.

With workbenches of this type, a portable circular saw can be converted to a stationary circular table saw. When using it as a circular saw, it is a good idea to fit the slot-shaped opening in the workpiece supporting panel, generally made of sheet steel, with a chippable slot insert of aluminum or plastic for example. If the saw blade shifts sideways while sawing, this is quickly called to the operator's attention by the fact that the blade cuts into the slot insert, indicating that the circular saw must be realinged and reclamped firmly to the mounting plate. Using a readily chippable slot insert avoids the danger that pieces of hard metal will fly off the blade when using circular saw blades equipped with hard metal [teeth].

Accordingly, it is an object of the present invention to provide a workbench construction which avoids, by simple means, shortcomings and disadvantages encountered in the prior art.

Another object of the present invention resides in providing a workbench which simplifies the mounting of mobile or portable machine tools thereon.

Yet another object of the present invention resides in providing a workbench which enables a mounting of mobile or portable machine tools without requiring considerable expenses for retrofitting of the machine tools.

A still further object of the present invention resides in providing a workbench which is simple in construction and therefore relatively inexpensive to manufacture.

These and other objects, features and advantages of the present invention will become more apparent from the following description when taken in connection with the accompanying drawings which show, for the purposes of illustration only, one embodiment in accordance with the present invention.

DETAILED DESCRIPTION

Figure 1:
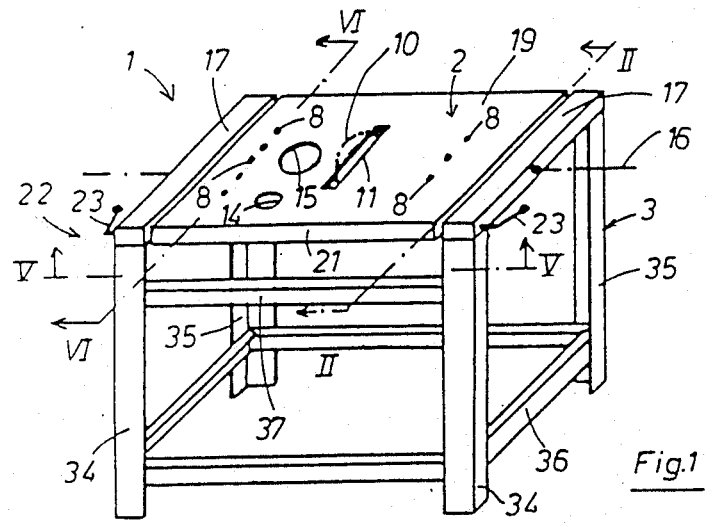
FIG. 1 is a perspective view of a workbench constructed in accordance with the present invention.
Figure 2:
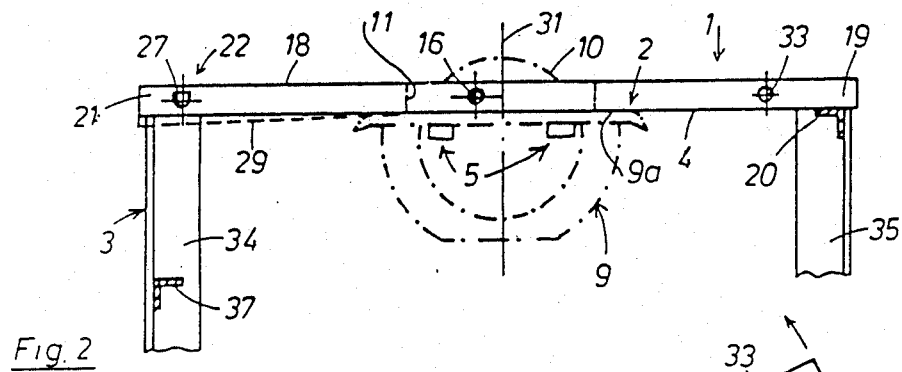
FIG. 2 is a cross-sectional view of the workbench of the present invention, taken along the line II—II in FIG. 1, with a workpiece supporting panel locked in an operative position.

Referring now to the drawings wherein like reference numerals are used throughout the various views to designate like parts and, more particularly, to FIG. 1, according to this figure, a workbench generally designated by the reference numeral 1 includes a workpiece supporting panel generally designated by the reference numeral 2 carried by a trestle generally designated by the reference numeral 3. The trestle 3 includes four legs 34, 35 attached at ends of lateral frames 17, with the legs 35 on a stop side being joined together by the abutment strip 20 (FIG. 2). Additionally, the legs 34, 35 are strutbraced together by a base frame 36 and, to additionally rigidify or reinforce the trestle 3, the legs 34 are joined together on a side of a locking device generally designated by the reference numeral 22 by a further cross-strut 37 lying at a level somewhat lower than the abutment strip 20. Consequently, the end rim or edge 21 of the supporting panel 2 can freely move past the cross-strut 37 during a pivoting step described more fully hereinbelow and indicated by the arrow 38 in FIG. 3.

Figure 4:
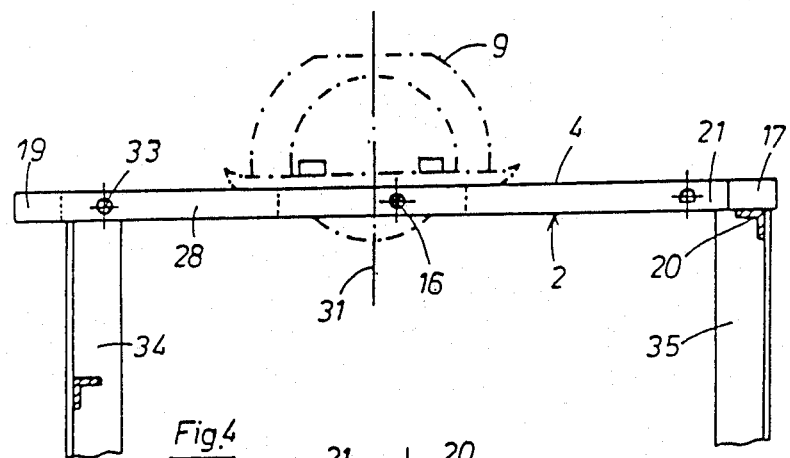
FIG. 4 is a cross-sectional view taken along the line II—II in FIG. 1 of the workbench of the present invention with the supporting panel locked in a mounting position.
Figure 5:
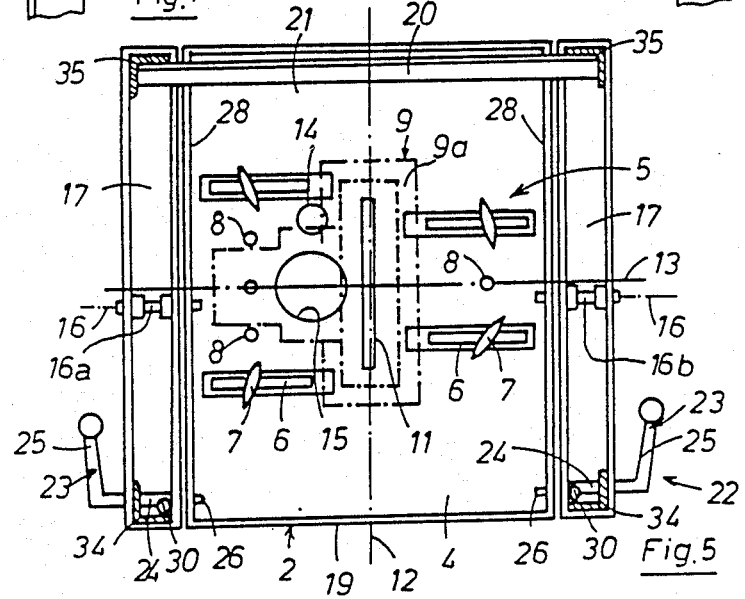
FIG. 5 is a cross-sectional view of the workbench of the present invention taken along the line V—V in FIG. 1.

As shown most clearly in FIGS. 2 and 5, clamping means generally designated by the reference numeral 5 are provided on an underside 4 of the workpiece supporting panel 2, with the clamping means including a plurality of clamping shoes 6 respectively associated with a plurality of clamping bolts 7. A plurality of mounting bores 8 (FIGS. 1, 5) are arranged in the supporting panel 2 for enabling an attachment of the clamping bolts so that almost any type of conventional manually operated mobile or portable machine tool can be affixed to the underside of the workpiece supporting panel 2. For example, as shown in FIGS. 1-4, a circular saw generally designated by the reference numeral 9, illustrated in phantom lines, may be affixed by means of a shoe-plate 9a to the underside 4 of the supporting panel 2, with a saw blade 10 of the circular saw 9 penetrating a slot-like cutout or opening 11 in the supporting panel 2. The cutout or opening 11 is located at a point of intersection of the axes of symmetry 12, 13 (FIG. 5) of the supporting panel 2. Moreover, additional cutouts or openings 14, 15 (FIGS. 1, 5) are disposed along one side of the slotlike opening for respectively enabling a mounting of a compass saw and a router.

Figure 3:
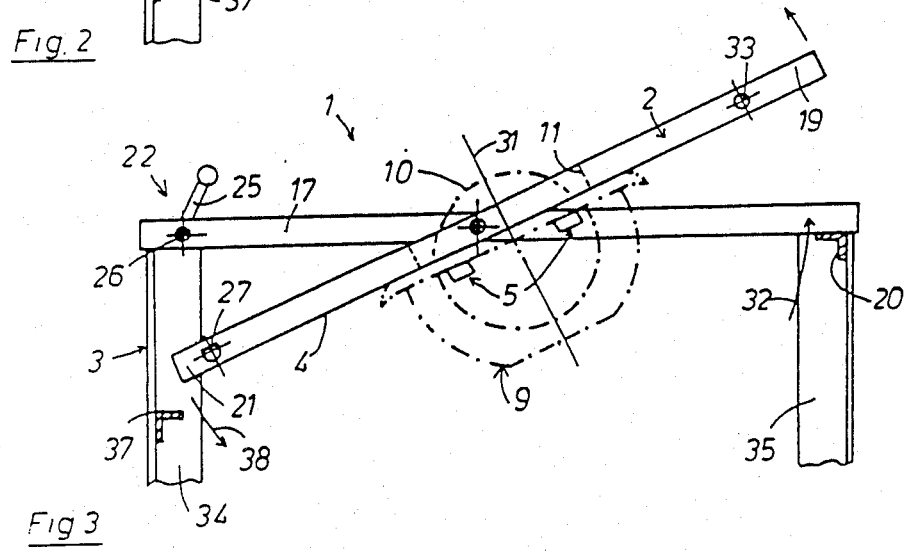
FIG. 3 is a cross-sectional view taken along the line II—II in FIG. 1 of the workbench during a pivoting of the workpiece supporting panel.

As shown most clearly in FIGS. 2-4, the supporting panel 2 can be swung or pivoted from an operative position (FIG. 2) about a pivot axis 16 through an angle of 180° into a mounting position (FIG. 4) wherein an underside 4 of the supporting panel 2 is freely accessible. The pivot axis 16 is formed by two short axles 16a and 16b, each of which is supported in one of the lateral frames 17 and engages a hole in one of the side walls 28 of the supporting panel 2. The supporting panel 2 is supported in lateral frames 17 of the trestle 3, enclosing the supporting panel 2 on both sides and forming, together with the topside 18 of the supporting panel 2, a combined resting plane for workpieces or the like. In the operative position (FIG. 2), the supporting panel 2 rests on a substantially L-shaped strip stop or abutment 20 of the trestle 3 with an end rim or edge 19 of the supporting panel 2 extending in parallel to the pivot axis 16, whereas, a locking device generally designated by the reference numeral 22 engages at the opposite end rim or edge 21.

As shown most clearly in FIG. 5, the locking device 22 includes at least a pair of eccentric lever means 23 located on both sides of the supporting panel 2, with the lever means 25 respectively including a bearing pin 24 and a one-arm operation lever 25 with a tightening handle, projecting approximately at a right angle from the bearing pin 24 on the end side. The bearing pins 24 are mounted in the lateral frames 17 and engage with a unilaterally flattened zone 26 into an associated opening 27 associated therewith, which opening 27 is unilaterally flattened but is of a larger size and is provided in downwardly extending side walls 28 of the supporting panel 2.

Figures 6, 7:
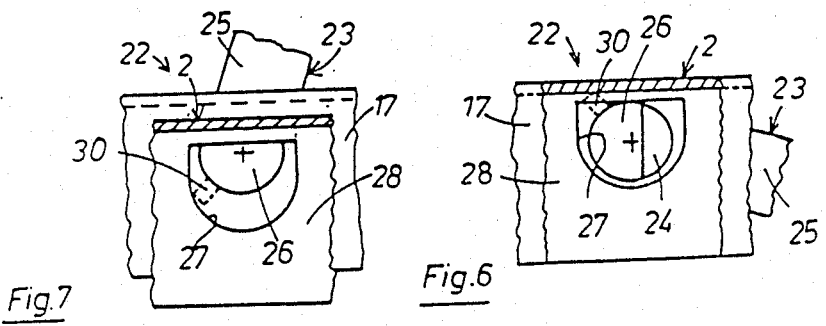
FIG. 6 is a cross-sectional detail view, on an enlarged scale, of a locking device for the supporting panel of the workbench of the present invention taken along the line VI—VI of FIG. 1.
FIG. 7 is a cross-sectional detail view, on an enlarged scale, of the locking device for the supporting panel of the workbench of the present invention in a released position.
Figure 8:
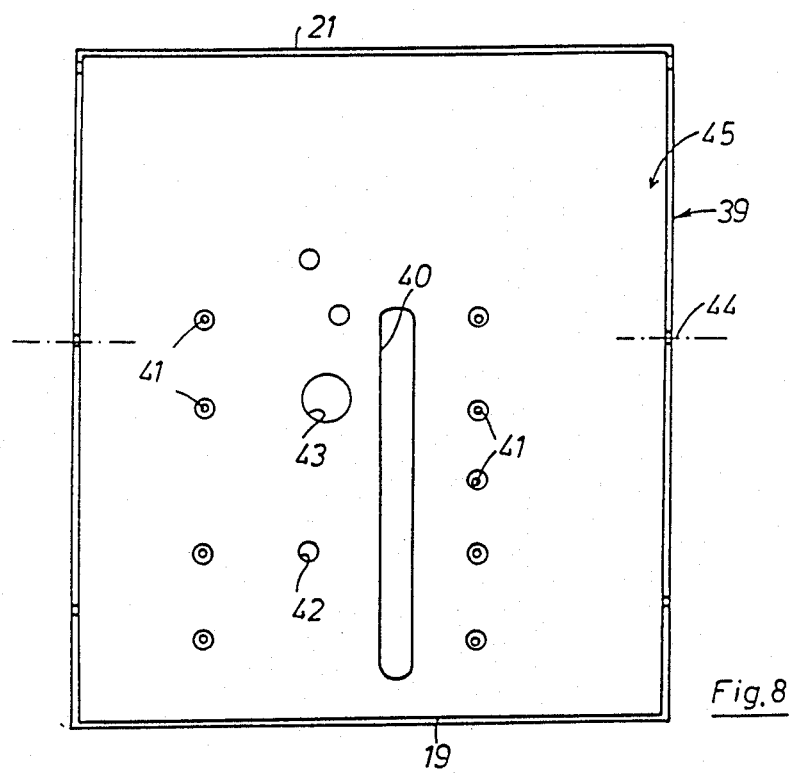
FIG. 8 shows a modified embodiment of the workpiece supporting panel in a bottom view.

By virtue of the eccentric shape of the flattened pin zones or areas 26, the supporting panel 2 may be urged from a loose resting position against the stop 20 by a turning of the operating levers 23 as shown in FIG. 6, with the supporting panel 2 experiencing or being subjected to an elastic upward flexing on a side of the locking device 22. The relaxed or resting position of the supporting panel 2 is represented in FIG. 2 by the phantom line 29; whereas, the fixed position is represented by the solid lines in FIG. 2.

In the relaxed position, the one-armed operating levers 25 of the eccentric lever means 23 project approximately perpendicularly in an upward direction; whereas, in the clamping position, the operating levers 25 are oriented or extend approximately parallel to the supporting panel 2, that is, in a horizontal direction. Consequently, the eccentric lever means 23 can be turned, it at all, by machine vibrations along lines of the fixed clamping of the supporting panel 2. In order to release the supporting panel 2, the flattened pin zones or areas 26 can be pulled out of the openings 27 of the supporting panel 2, with, as shown most clearly in FIGS. 5 and 6, stop pins 30 preventing a complete extraction of the bearing pin 24 from the lateral frame 17. The stop pins 30 can be further utilized for limiting a path of rotation of the eccentric levers 23 as shown most clearly in FIGS. 6 and 7.

After a release, the supporting panel 2 can be freely swung or pivoted in the manner shown in FIG. 3. In this arrangement, the pivot axis 16 lies, on the side of the locking device 22, at a distance remote beside the corresponding axis of symmetry 13 of the supporting panel 2 and, respectively, beside the central surface normal 31. Accordingly, the end rim or edge 21 lying in the operative position on the side of the locking device 22 can be freely swung or pivoted past the abutment strip 20 as indicated by an arrow 32 in FIG. 3. In order to fix the supporting panel 2 in the mounting position, as shown in FIG. 4, additional openings 33 are provided in the side walls 28 of the supporting panel 2 in a region or area of the end rim or edge 19 that originally was on the stop side. The bearing pin 24 can be introduced in the openings 33 with their flattened zones 26 to lock the supporting panel 2 in the mounting position. Alternatively, for provisional operations, it is sufficient to place the supporting panel 2 loosely on the bearing pin 24. Thus the bearing pin 24 can act as either a locking device or as a stop or abutment for retaining the supporting panel 2 in the mounting position.

The workbench 1, in spite of the pivotability of the supporting panel 2, can be supplemented by all of the usual and customary accessories or supplementary elements. In this connection, it is possible to provide the workbench 1 with supplementary elements such as, for example, a protective cover hood for the saw blade 10 of the circular saw 9, enlargement members for the workpiece supporting surface attachable to the lateral frames 17, emergency switches for the machine tools, angularly fixed or pivotable abutments for the workpieces, etc. which supplementary elements, for the sake of clarity, are not illustrated in detail in the drawings.

During the fixed clamping of the machine tool, two scales $S_1$, $S_2$, provided on the underside 4 of the supporting panel 2, are utilized for parallel alignment and optional fixation of the lateral offsetting, of, for example, the circular saw 9, if the circular saw blade 10 is to be secured in a position inclined with respect to the top side 18 of the supporting panel 2 at an angle of inclination of, for example, 45°.

FIGS. 8 to 11 show another embodiment of a workpiece supporting panel 39 in a bottom view and in a position analogous to FIG. 5, the underside of the panel 39 being generally designated by the reference numeral 45. The elongated opening 40 permits passage of the circular saw blade, mounting holes 41 are provided for the bolts of clamping jaws 6 and openings 42 and 43 are provided for a compass saw or router and in this embodiment lie essentially between the edge 19 and plate 39 on the stop side and pivot axis 44.

Figure 9:
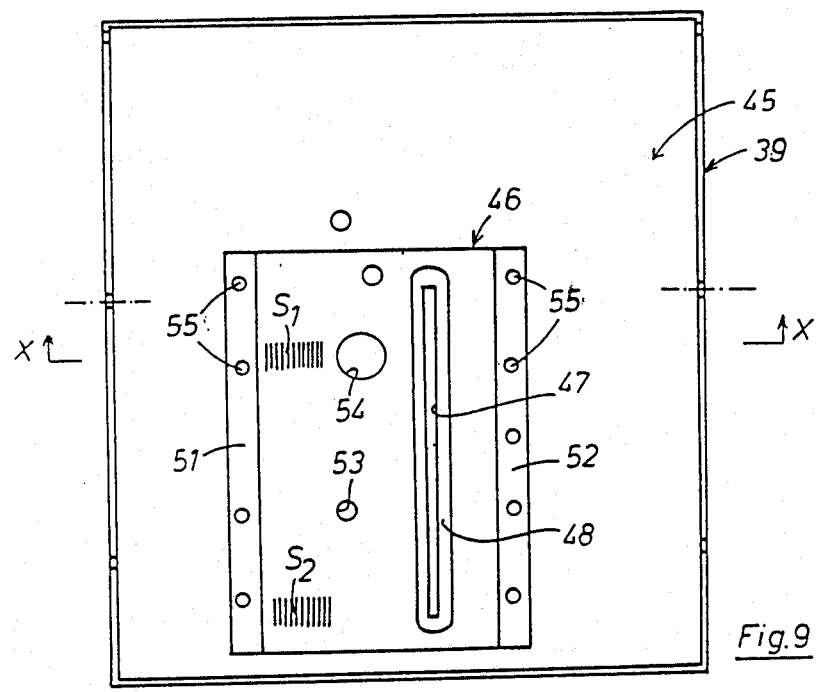
FIG. 9 shows the workpiece supporting panel according to FIG. 8 with slot insert plate inserted.
Figure 10:
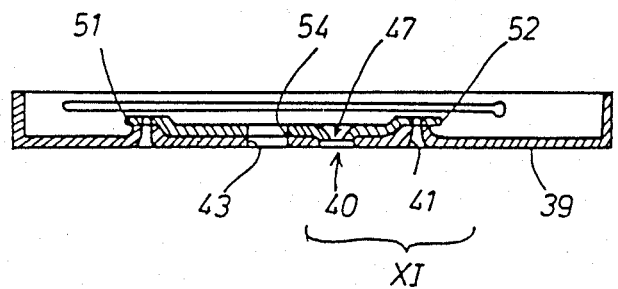
FIG. 10 is a section along line X—X in FIG. 9.
Figure 11:
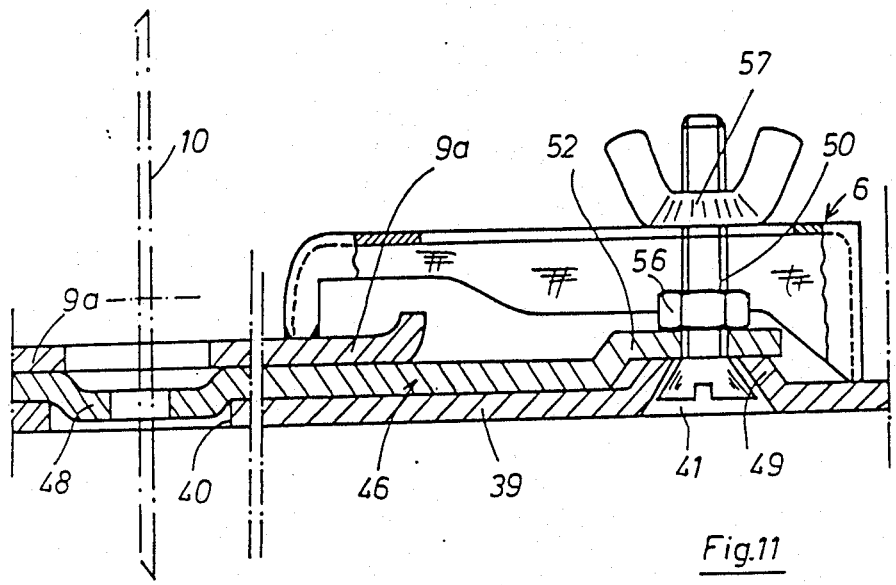
FIG. 11 shows a cutaway view and on an enlarged scale, the slot insert plate according to FIGS. 9 and 10 in the clamped position.

FIG. 9 shows a slot insert plate 46 mounted on the underside 45 of supporting panel 39, the plate 46 having a slot-shaped opening 47 which is narrower than opening 40 in support panel 39 and whose edge area 48 is raised into opening 40 and forms a closed circumferential collar. As is evident from FIG. 11 in particular, which shows section XI in FIG. 10 on an enlarged scale, workpiece supporting panel 39 is provided in the vicinity of each of its mounting holes 41 with conical depressions 49, the tips of said depressions being cut off at a certain height to form through openings 41 for the recessed-head mounting bolt 50 of clamping jaws 6. Each mounting bolt 50 is carrying a nut 56 for the insert plate 46 and a nut 57 for the clamping jaws. Insert plate 46 has two edge strips 51, 52 double-bent to this height, in which strips a plurality of mounting holes 55, aligned with the holes 41 in mounting panel 39, are provided for bolts 50 of the clamping device. As shown in FIG. 11, slot insert plate 46, when a circular saw is mounted between workpiece supporting panel 39 and guide panel 9a, is clamped firmly by the same clamping jaws 6 by which the circular saw is also fastened. In addition, slot insert plate 46 is provided with two additional openings 53, 54 which are aligned flush with openings 42, 43 of workpiece supporting panel 39.

When the tool is clamped in place, the two scales $S_1$ and $S_2$ provided on slot insert plate 46 are used for parallel alignment and possibly for determining the lateral displacement of circular saw 9, for example, when circular saw blade 10 is to be clamped firmly in a position inclined with respect to the table top, e.g. at 45°.

The invention offers the advantage that only one loose component is required for the slot insert which, when using the clamping device for the circular saw which is present in any event, can be clamped reliably to the workpiece supporting panel and if necessary can be replaced by a new slot insert plate in a few steps. Since, in the workbench according to the invention, the workpiece supporting panel can be swiveled through 180° to a mounting position in which its underside is uppermost, the slot insert plate can readily be clamped along with the guide plate for the portable circular saw using the clamping jaws 6 usually employed as a clamping device.

While I have shown and described only one embodiment in accordance with the present invention, it is understood that the same is not limited thereto but is susceptible of numerous changes and modifications as known to one having ordinary skill in the art and I therefore do not wish to be limited to the details shown and described herein, but intend to cover all such modifications as are encompassed by the scope of the appended claims.

Figure 12:
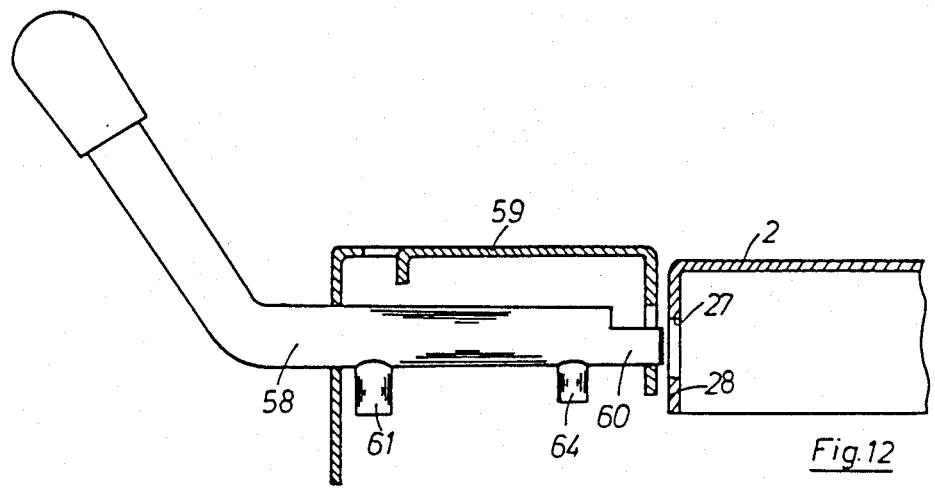
FIG. 12 shows a modified embodiment of the locking device in a released position.
Figure 13:
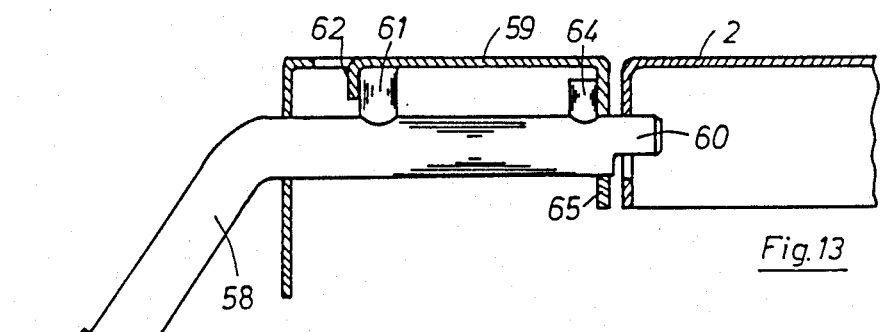
FIGS. 13 and 14 show the modified locking device in a locking position.
Figure 14:
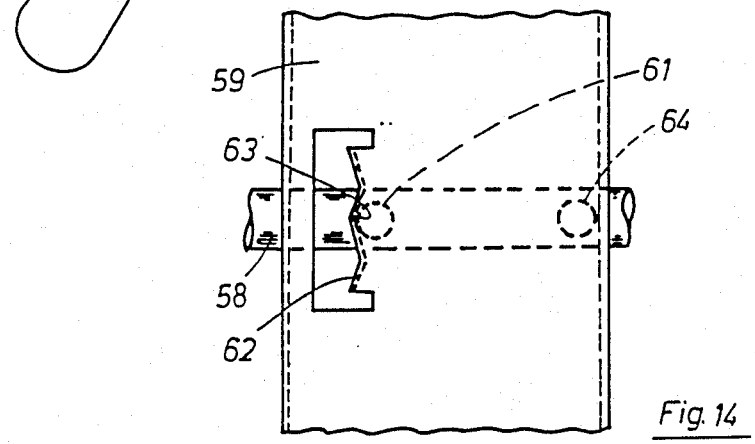

FIGS. 12 to 14 show another embodiment of the locking device having an operation lever 58 with a flattened zone 60, which is retracted in FIG. 12 from the opening 27 in the side wall 28 of the supporting panel 2. The operation lever 58 is mounted in the lateral frame 59 of the trestle and is provided with a radially directed pin 61 being on the same side of the operation lever 58 as the flattened zone 60 and in close neighborhood to the outer side wall of the side frame 59. A stop tongue 62 is cut out and bent down from the top wall of the side frame 59. In the locked position according FIG. 13 the pin 61 is somewhat shifted inwardly and turned behind the stop tongue 62 by rotating the operation lever 58 about 180°, whereby the operation lever 58—in cooperation with the weight of the now downwards directed grip of the operation lever 58—is locked itself, so that the locking position of the supporting panel 2 is secured against loosening by vibrations.

As shown in FIG. 14 the stop tongue 62 is W-formed with a resting seat 63 in the middle part for the pin 61. The operation lever 58 is provided with a further pin 64 directed parallely to the pin 61 and being in close neighborhood to the flattened zone 60. In the locked position according FIGS. 13 and 14 the pins 61 and 64 are severely clamped between the stop tongue 62 and the inner side wall 65 of the side frame 59. In the locked position the supporting panel 2 is elastically bent up exactly to the level of the upper wall of the side frames 59.

I claim:

1. A workbench comprising a trestle means, a supporting panel means for supporting a workpiece, said supporting panel means having a first end and a second end, clamping means for rigidly attaching a manually operated machine tool on an underside of the supporting panel means, means provided in a portion of the supporting panel means for enabling a portion of the machine tool to extend above a top side of the supporting panel means, means for mounting said supporting panel means on said trestle means so as to enable said supporting panel means to be pivoted about a pivot axis through an angle of 180° from an operative position to a machine tool mounting position, and retaining means, provided on said trestle means, for locking said supporting panel means in the operative position with the first end of said supporting panel means resting on a portion of the trestle means and the second end of said supporting panel means elastically bent in an upward direction by said retaining means, and for retaining said supporting panel means in the mounting position.

2. A workbench according to claim 1, wherein said supporting panel means is a sheet metal supporting panel.

3. A workbench according to claim 1, wherein the supporting panel means has a substantially rectangular configuration, and wherein the pivot axis lies beside one axis of symmetry of the supporting panel means.

4. A workbench according to claim 1, wherein the pivot axis lies on one of the axes of symmetry of the supporting panel means.

5. A workbench according to claim 3, wherein a stop means is provided on the trestle means for preventing movement of the supporting panel means when said supporting panel means is in the operative position, and wherein, in the operative position of the supporting panel means, the first end is disposed on said stop means and extends in parallel to the pivot axis, and said retaining means engages in an area of the second end of the supporting panel means.

6. A workbench according to claim 5, wherein said stop means includes an abutment strip fixedly mounted to the trestle means and extending in parallel to the first end, and wherein the pivot axis lies on a side facing away from the abutment strip at a distance spaced from and adjacent to a corresponding axis of symmetry of the supporting panel means.

7. A workbench according to claim 6, wherein said retaining means urges said supporting panel means against said stop means.

8. A workbench according to claim 7, wherein said trestle means includes lateral frame means for encompassing said supporting panel means, and wherein said retaining means includes a pair of eccentric lever means arranged at respective sides of the supporting panel means, means are provided for mounting said lever means at the lateral frame means of said trestle means, said supporting panel means being adapted to be urged by said lever means from a loose resting position against said stop means.

9. A workbench according to claim 8, wherein said supporting panel means includes downwardly extending side walls, and wherein each of said eccentric lever means includes a bearing pin means unilaterally flattened along a portion of a length thereof so as to define the flattened pin area insertable as an eccentric means in openings provided in said downwardly extended side walls of the supporting panel means, and wherein opening means are provided in said side walls at respective opposite longitudinal ends thereof for fixing the supporting panel means in the mounting position.

10. A workbench according to claim 9, wherein the eccentric lever means further include one-armed operating levers projecting at an end side approximately perpendicularly from the bearing pin means.

11. A workbench according to claim 10, wherein said trestle means includes four legs attached to ends of the lateral frame means, two of said legs are joined together by said abutment strip, and a cross strut means is provided for joining two opposite legs together, said strut means being disposed at a lever below said abutment strip.

12. A workbench according to claim 11, further comprising a base frame means for strut-bracing the legs together.

13. A workbench according to claim 12, wherein said means for enabling a portion of the machine tool to extend above the topside of the supporting panel means includes at least one cutout for accommodating the portion of the tool.

14. A workbench according to claim 13, wherein a plurality of cutouts are provided in the supporting panel means for enabling a mounting of a plurality of different machine tools to the supporting panel means.

15. A workbench according to claim 14, wherein said plurality of cutouts are arranged approximately adjacent the pivot axis of the supporting panel means and the axis of symmetry extending in parallel thereto in a side-by-side relationship.

16. A workbench according to claim 13, wherein said at least one cutout is arranged approximately adjacent the pivot axis of the supporting panel means and the axis of symmetry extending in parallel thereto, in a side-by-side relationship.

17. A workbench according to claim 1, wherein said supporting panel means has a substantially rectangular configuration and is pivotable about a pivot axis lying beside one axis of symmetry of the supporting panel means.

18. A workbench according to claim 1, wherein said supporting panel means has a substantially rectangular configuration and is pivotable about a pivot axis lying on one axis of symmetry of the supporting panel means.

19. A workbench according to claim 1, wherein a stop means is provided on the trestle means for preventing movement of the supporting panel means when said supporting panel means is in the operative position, and wherein, in the operative position of the supporting panel means, a first end of the supporting panel means is disposed on said stop means and extends in parallel to the pivot axis, and said retaining means engages in an area of a second end of the supporting panel means disposed opposite said first end.

20. A workbench according to claim 19, wherein said stop means includes an abutment strip fixedly mounted to said trestle means and extending in parallel to the first end of said supporting panel means, and wherein the pivot axis lies on a side facing away from the abutment strip at a distance spaced from an axis of symmetry of the supporting panel means.

21. A workbench according to claim 1, further comprising stop means on said trestle means for preventing movement of the supporting panel means when said supporting panel means is in the operative position, and wherein said retaining means are adapted to urge said supporting panel means against said stop means.

22. A workbench according to claim 1, further comprising stop means on said trestle means for preventing movement of the supporting panel means when said supporting panel means is in the operative position, said trestle means includes lateral frame means for encompassing said supporting panel means, and wherein said retaining means includes a pair of eccentric lever means arranged at respective sides of the supporting panel means, means are provided for mounting said lever means at the lateral frame means of said trestle means, said supporting panel means being adapted to be urged by said lever means from a loose resting position against said stop means.

23. A workbench according to claim 22, wherein said supporting panel means includes downwardly extending side walls, and wherein each of said eccentric lever means includes a bearing pin means unilaterally flattened along a portion of a length thereof so as to define the flattened pin area insertable as an eccentric means in openings provided in said downwardly extended side walls of the supporting panel means, and wherein opening means are provided in said side walls at respective opposite longitudinal ends thereof for fixing the supporting panel means in the mounting position.

24. A workbench according to claim 23, wherein the eccentric lever means further include one-armed operating levers projecting at an end side approximately perpendicularly from the bearing pin means, said operating levers being disposed, in a locked position of the supporting panel means, approximately in parallel to the supporting panel means and, in a released position, projecting approximately perpendicularly in an upward direction.

25. A workbench according to claim 1, wherein said trestle means includes four legs attached to ends of the lateral frame means, two of said legs are joined together by said abutment strip, and a cross strut means is provided for joining two opposite legs together, said strut means being disposed at a level below said abutment strip.

26. A workbench according to claim 24, further comprising a base frame means for strut-bracing the legs together.

27. A workbench according to claim 1, wherein said means for enabling a portion of the machine tool to extend above the topside of the supporting panel means includes at least one cutout for accommodating the portion of the tool.

28. A workbench according to claim 27, wherein a plurality of cutouts are provided in the supporting panel means for enabling a mounting of a plurality of different machine tools to the supporting panel means.

29. A workbench according to claim 28, wherein said plurality of cutouts are arranged approximately adjacent the pivot axis of the supporting panel means and the axis of symmetry extending in parallel thereto in a side-by-side relationship.

30. A workbench according to claim 1, wherein said machine tool is one of a circular saw, compass saw, and a router.

31. A workbench according to claim 10, wherein the lateral frame means includes stop tongues, and wherein each of the operation levers include a radially directed pin, which is clamped in the locking position of the operation levers behind one of the stop tongues.

32. A workbench according to claim 1, wherein said means for enabling a portion of the machine tool to extend above the top side of the supporting panel means includes at least one cutout for accommodating the portion of the tool.

33. A workbench according to claim 32, further comprising a slot insert plate of a chippable material lining said at least one cutout.

34. A workbench according to claim 33, wherein said slot insert plate has a slot-shaped opening adapted to allow a saw blade to pass therethrough, said slot-shaped opening being narrower than said opening in said workpiece supporting panel and its edge area being raised to serve as a lining in said opening in said workpiece supporting panel.

* * * * *